(No Model.)
S. A. ROSENTHAL & V. C. DOUBLEDAY.
ELEMENT FOR SECONDARY BATTERIES.
No. 520,614. Patented May 29, 1894.
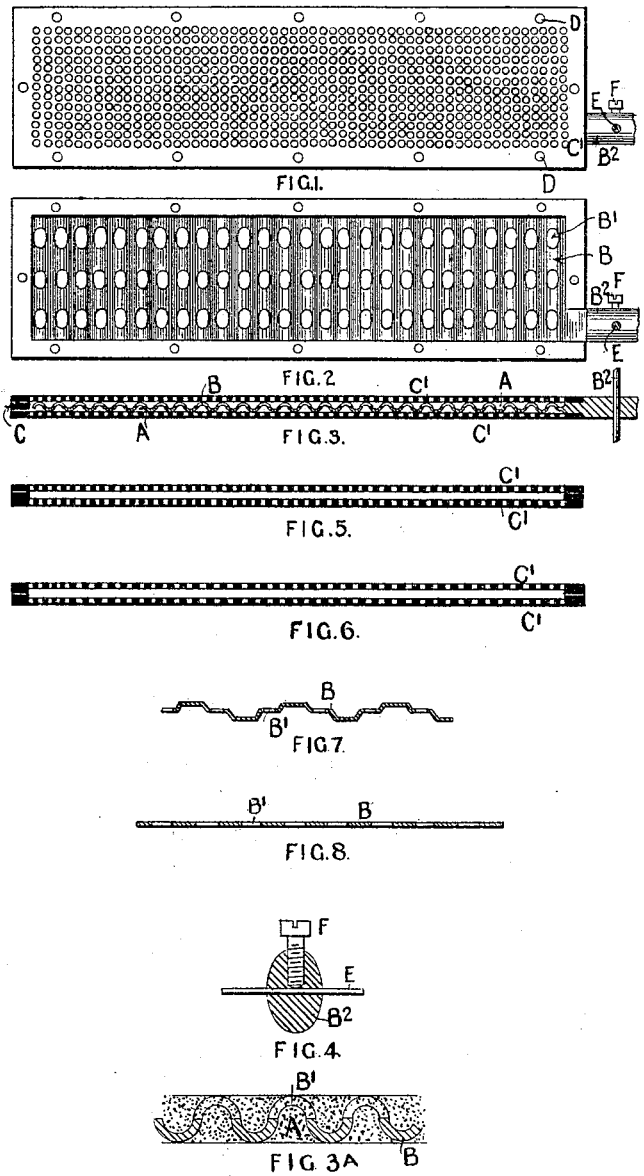
Witnesses:
H. G. Dieterich
O. W. Sommers
Inventors:
Sigmund A. Rosenthal and
Villeroy C. Doubleday,
by Henry ___, atty
THE NATIONAL LITHOGRAPHING COMPANY,
WASHINGTON, D. C.

UNITED STATES PATENT OFFICE.

SIGMUND ADOLF ROSENTHAL AND VILLEROY CORNEY DOUBLEDAY, OF LONDON, ENGLAND.

ELEMENT FOR SECONDARY BATTERIES.

SPECIFICATION forming part of Letters Patent No. 520,614, dated May 29, 1894.

Application filed December 5, 1892. Serial No. 454,110. (No model.)

*To all whom it may concern:*

Be it known that we, SIGMUND ADOLF ROSENTHAL, a subject of the Emperor of Germany, and VILLEROY CORNEY DOUBLEDAY, a subject of the Queen of Great Britain, both residing at 27 Walbrook, in the city of London, England, have invented new and useful Improvements in Elements for Secondary Batteries, of which the following is a specification.

These secondary batteries have the following characteristic features—viz., that the liquid has perfect access to the active material, that the latter is so held as to obviate all tendency to buckling of the plate, that the active material is in a highly sub-divided and porous state and can be charged and discharged at a very high rate, that the entire weight and bulk of the plate are very small relatively to the power capacity and that the whole construction is simple, strong and cheap.

Figure 1 is a plan of an element; Fig. 2 plan with a cover removed; Fig. 3 longitudinal section; Fig. 3$^A$ enlarged section of plate and Fig. 4 an enlarged cross section through the tang. Fig. 5 is a section through a modified form of plate inclosing box; Fig. 6 a similar view of another modified form of box; Fig. 7 longitudinal section through a modified form of plate and Fig. 8 a like view of another modified form of plate.

The active material is held in spaces A of a perforated and corrugated piece of sheet lead B, forming the conductor, so that the material on both sides is keyed together by the material itself in the perforations B', the keys forming the means of perfect continuity. This plate A B is contained within a box or envelope having perforations for giving the liquid access to the material. C is a frame of ebonite or other suitable non-conducting material of about the height or thickness of the plate A B within it. The frame C is on each side covered by a perforated lid C' of ebonite or other suitable non-conducting material, the lids C' and the frame C being held together by through rivets D or in any other suitable manner so as to form a box. The frame C is formed with a recess for the plate tang B$^2$, to pass out. This tang is made thicker at its outside end with a shoulder at each side against the frame C and the lid C' for the sake of strength and for easy connecting up; it may be of oval section as shown in Fig. 4, the connecting wire E being carried through it and fixed by means of a screw F.

In Fig. 5 the box is shown with one cover made in one with it.

Fig. 6 shows a box made in two halves. Or the box may be like an ordinary box with sliding lid at top or at top and bottom, both perforated.

The perforated plate B may be of other corrugated form such, for instance, as shown in Fig. 7 or it may be made flat as in Fig. 8.

What we claim as our invention, and desire to secure by Letters Patent, is—

A secondary battery element comprising a perforated and corrugated plate or sheet of lead provided with a connecting tang the diameter of which differs at different points of its length, an active material in which said plate is embedded, and an inclosing casing or box in which said embedded plate is firmly held, said box constructed of a perforated non-conductive rigid material and provided with an opening of the same size as the portion of least diameter of the tank, for the purpose set forth.

SIGMUND ADOLF ROSENTHAL.
VILLEROY CORNEY DOUBLEDAY.

Witnesses:
  DAVID MCGAW,
77 *Chancery Lane, London.*
  THOMAS LAKE,
17 *Gracechurch Street, London.*